No. 822,756. PATENTED JUNE 5, 1906.
F. M. NEEDHAM.
FLUE STOPPER.
APPLICATION FILED JULY 11, 1905.
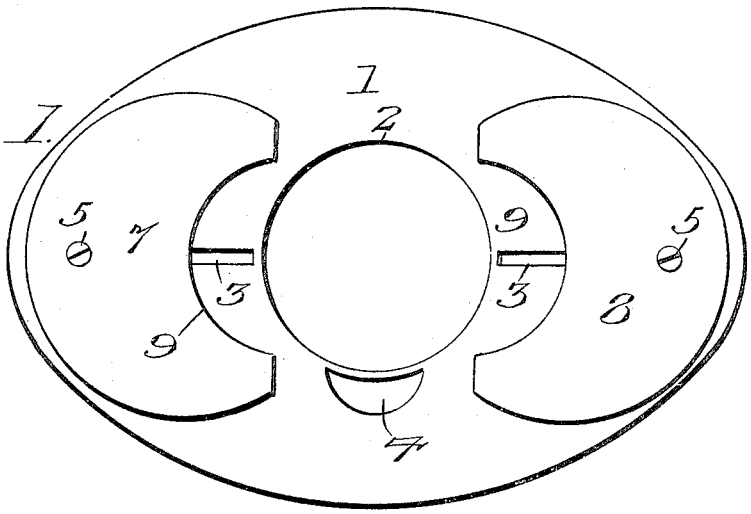
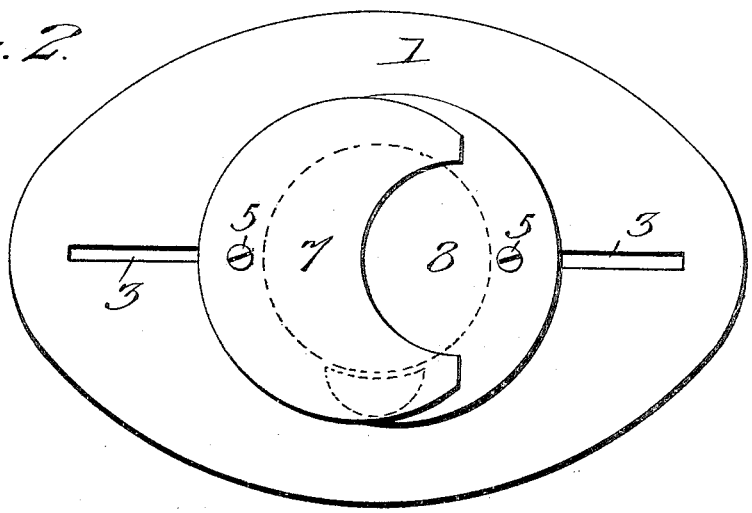
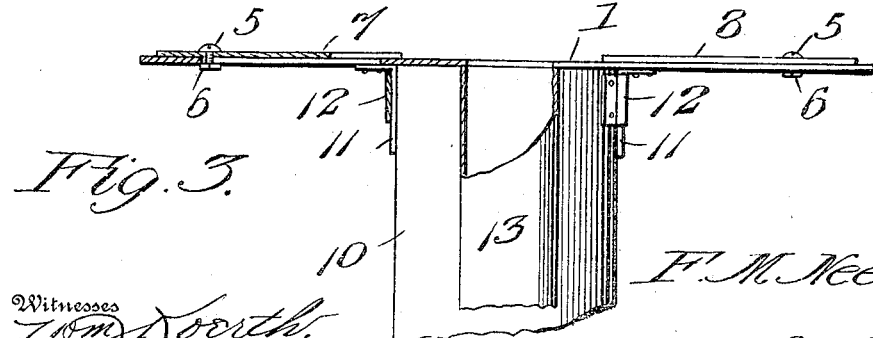
Witnesses
Wm. Koorth,
C. C. Hiner.
Inventor
F. M. Needham,
By Victor J. Evans
Attorney

UNITED STATES PATENT OFFICE.

FRANCIES M. NEEDHAM, OF ANDERSON, INDIANA.

FLUE-STOPPER.

No. 822,756.　　　　Specification of Letters Patent.　　　　Patented June 5, 1906.

Application filed July 11, 1905. Serial No. 269,248.

*To all whom it may concern:*

Be it known that I, FRANCIES M. NEEDHAM, a citizen of the United States of America, residing at Anderson, in the county of Madison and State of Indiana, have invented new and useful Improvements in Flue-Stoppers, of which the following is a specification.

This invention relates to flue-stoppers of that type comprising an escutcheon flange or wall-plate used in connection with or without a pipe-inclosing collar or thimble and provided with closing members to embrace the pipe and close the joint between the same and the pipe aperture in the escutcheon-plate.

The object of the present invention is to provide a flue-stopper of this character provided with closing members which are adjustable to fit tightly about the pipe to close the opening between the wall of the pipe-aperture and the pipe when the flue is in use and which are also adjustable to completely close the aperture when the pipe is removed and the flue is not in use, the closing members being adapted to fit about pipes of different sizes within reasonable limits.

A further object is to provide a flue-stopper having a pipe collar or thimble and escutcheon flange or plate provided with a duct or passage to permit foul air to escape from the room, so as to secure effective ventilation.

The preferred embodiment of the invention is illustrated in the accompanying drawings, in which—

Figure 1 is a front elevation of the improved flue-stopper, the closing members being shown adjusted outward to the limit of their movement to permit of the insertion of a pipe. Fig. 2 is a similar view showing the closing members adjusted to form a stopper closing the aperture in the escutcheon-plate, and Fig. 3 is a side elevational view of the device with parts broken away to better show the construction.

Referring now more particularly to the drawings, the numeral 1 designates an escutcheon flange or wall-plate provided with a central circular pipe-aperture 2. This plate is preferably of oval form, as shown, and is provided at diametrically opposite sides of the aperture 2 with guide-slots 3, extending outwardly in the plane of its major axis, and below the opening 2, with a vent-aperture 4 of any preferred form.

Slidably mounted in the slots 3 so as to be adjustable radially toward and from the pipe-aperture 2 are supporting members 5, consisting in the present instance of ordinary screw-bolts having their heads arranged upon the front side of the plate and provided in rear thereof with nuts 6 for retaining said bolts in applied position. Upon these supporting members are pivotally mounted closing-plates 7 and 8, which are adjustable therewith toward and from the aperture 2 and are also adapted to swing thereon to completely close said aperture in the manner hereinafter described. Each closing-plate 7 is approximately of crescent form, being reduced from a complete circular formation by cutting away a portion thereof, thus providing a segmental recess 9, the two recesses 9 being of proper form to adapt the plate to fit about a pipe projecting through the aperture 2 and to close the joint between the same and said aperture to prevent particles of the products of combustion from passing from the flue into the room and to form an ornate joint. The segmentally-recessed portions of the two closing-plates are normally arranged to face inwardly or toward the pipe-aperture in the escutcheon-plate, and said closing-plates are eccentrically pivoted upon the pivot-bolts 5, the pivotal points being disposed adjacent their outer edges, so that the closing-plates may be swung above or below their plane of sliding movement to position their recessed edges 9 to conform to slight irregularities in shape of stove-pipes. When the pipe is withdrawn from the flue, the plates 7 and 8 may be slid inwardly until their recessed edges 9 pass one another or overlap, as shown in Fig. 2, in which adjusted arrangement the two closing-plates will coöperate to form a substantially circular stop to completely close the pipe-aperture 2 as well as the vent-aperture 4. By the described mode of mounting the plates it will be seen that said plates may be adjusted to close the joints between escutcheon-plates and pipes differing in size within reasonable limits.

The escutcheon-plate is connected with a collar or thimble 10, adapted to project into the flue-opening and to surround the pipe. The plate may be rigidly secured to the thimble in any preferred manner, but is shown in the present instance removably and adjustably connected therewith by providing said escutcheon-plate with rearwardly-projecting tongues 11 to slidably and frictionally engage keeper-loops 12, carried by the thimble. The thimble is provided with a vent channel or passage 13, preferably formed by an independent piece of sheet metal bent into approximately semicircular form and having its edges projected outwardly at an angle to form flanges which are riveted or otherwise fastened to the body of the thimble. This channel extends longitudinally the full length of the thimble and communicates at its forward end with the vent-aperture 4 to provide an escape-passage for the outflow of foul air from the room or apartment into the chimney through the suction produced by the circulation of the escaping products of combustion. By this means the stopper is employed as an aid to free ventilation of the room or apartment, and the channel is made of such restricted size as to promote the outflow of foul air and prevent the escape of any of the smoke or products of combustion from the flue into the room.

It will be seen from the foregoing description that the stopper is not only simple and economical of construction, but is designed to afford a reliable, convenient, and ornamental attachment by which the pipe-opening may be entirely closed when the pipe is removed and the joint closed between the plate and pipe when the latter is in position for use. The escutcheon-plate may be secured, if desired, in any preferred manner to the wall, and said plate and the closing-plates may be suitably ornamented to form an attractive attachment.

Having thus described the invention, what is claimed as new is—

1. A flue-stopper comprising an escutcheon-plate provided with a pipe-aperture, and closing members disposed on opposite sides of the aperture and slidably adjustable toward and from the same, said plates being approximately of segmental form and adapted to be adjusted to close the joint between the wall of the aperture and a pipe or completely close the aperture when the pipe is removed.

2. A flue-stopper comprising an escutcheon-plate provided with a pipe aperture and slots at diametrically opposite sides of said aperture, supporting members slidably adjustable in said slots, and closing-plates carried by said supporting members, said plates being approximately of segmental form and adapted to be adjusted to close the joint between the wall of the aperture and a pipe or completely close the aperture when the pipe is removed.

3. A flue-stopper comprising a thimble provided with a vent-channel, an escutcheon-plate provided with a pipe-aperture and a vent-opening communicating with said channel, and closing members disposed on opposite sides of the aperture and slidably adjustable toward and from the same and from said vent-opening, said plates being approximately of segmental form and adapted to be adjusted to close the joint between the walls of the pipe-aperture and a pipe or completely close the pipe-aperture and vent-opening when the pipe is removed.

In testimony whereof I affix my signature in presence of two witnesses.

FRANCIES M. NEEDHAM.

Witnesses:
DE WITT C. CHIPMAN,
WILLIAM J. SULLIVAN.